United States Patent [19]

Mouri et al.

[11] 4,299,849
[45] Nov. 10, 1981

[54] CELLULASE TREATMENT OF ORANGE MATERIAL

[75] Inventors: Takenori Mouri, Toyonaka; Hiroyuki Kayama, Osaka, both of Japan

[73] Assignee: Toyo Seikan Kaisha Limited, Japan

[21] Appl. No.: 34,953

[22] Filed: Apr. 30, 1979

[30] Foreign Application Priority Data

Jun. 14, 1978 [JP] Japan ................................. 53/70760

[51] Int. Cl.³ ............................................. A23L 2/06
[52] U.S. Cl. ..................................... 426/51; 426/599
[58] Field of Search .................. 426/51, 49, 287, 590, 426/599, 615, 616, 489

[56] References Cited

FOREIGN PATENT DOCUMENTS

| | | | |
|---|---|---|---|
| 2038544 | 8/1970 | Fed. Rep. of Germany | 426/49 |
| 39-05340 | 6/1964 | Japan | |
| 51-0110056 | 9/1976 | Japan | 426/49 |

OTHER PUBLICATIONS

Woodroof, J. G. and Luh, B. S., *Commercial Fruit Processing*, AVI Publishing Co. ©1975, pp. 220, 221, 462 and 463.

*Primary Examiner*—Joseph M. Golian
*Assistant Examiner*—Elizabeth J. Curtin
*Attorney, Agent, or Firm*—Wenderoth, Lind & Ponack

[57] ABSTRACT

A process for producing orange juice which comprises steaming and crushing a whole orange or its rind, adding to the crushed material an enzyme produced by a microorganism of the genus Trichoderma or the genus Aspergillus and being free from those components having the activity of disintegrating the flavedo layer which will be eluted at a pH between 8 and 12 by fractionation, reacting the mixture at a temperature of 30° to 55° C., deactivating the enzyme, filtering the reaction mixture, and separating the residue.

1 Claim, 4 Drawing Figures

CELLULASE TREATMENT OF ORANGE MATERIAL

This invention relates to a process for producing orange juices from whole oranges or their rinds. More specifically, it relates to a process for producing orange juice by decomposing and softening cellulose and hemicellulose in the tissues and cell membranes of these raw materials not by any mechanical treatment but by the action of cellulase produced by specified microorganisms.

Some methods have been suggested in the past for producing juices by subjecting raw materials of this kind to the action of an enzyme having an optimum pH for enzymatic action in a weakly acidic range of about 2.5 to 6.5 (Japanese Pat. No. 534,039). With these methods, however, it is very difficult to remove the peculiar odor (the smell of molasses) and bitter taste attributed to the ingredients of the rind, and it has been the great problem in the art to overcome this difficulty.

It is an object of this invention to offer a solution to this problem.

The rind of a citrus fruit such as orange is composed of flavedo layer (yellow portion) containing oil gland cells at its outermost side and an albedo layer (white portion) inwardly of it. The present inventors made investigations on the basis of the knowledge that the unpleasant smell and bitterness of juices prepared by the conventional methods are due to the disintegration (decomposition) of the flavedo layer by the action of enzyme. These investigations led to the discovery that enzyme components having the activity of disintegrating plant tissues, which will be eluted at a pH of between 8 and 12, particularly between 9 and 11, by fractionation exhibit the action of disintegrating the flavedo layer, and therefore that to achieve the object of this invention, it is necessary to use cellulase which decomposes polysaccharides such as cellulose to monosaccharides and which do not have the activity of disintegrating plant tissues.

According to this invention, there is provided a process for producing a juice which comprises steaming and crushing a whole citrus fruit or its rind, adding to the crushed material an enzyme produced by a microorganism of the genus Trichoderma or the genus Aspergillus and being free from those components having the activity of disintegrating plant tissues (i.e., the activity of disintegrating the flavedo layer) which will be eluted at a pH between 8 and 12 by fractionation, reacting the mixture at a temperature of 30° to 55° C., deactivating the enzyme, filtering the reaction mixture, and separating the residue.

Use of this specified enzyme leads to the decomposition of only the albedo layer and the flesh, and the flavedo layer remains undecomposed and is separated as a residue. Hence, a juice free from offensive odor and bitterness can be obtained in a yield of at least 90%, and in some cases, more than 95%.

The present invention will be described further with reference to the accompanying drawings in which.

Commercially available C-TAP (tradename for an enzyme derived from a microorganism of the genus Trichoderma sold by Amano Pharmaceutical Co., Ltd.) and C-AP (an enzyme derived from a microorganism of the genus Aspergillus sold by the same company) can be used in the present invention. When these enzymes are purified by column chromatography, and fractionated in a customary manner under the following conditions.

Ampholine pH 1–12
Column capacity 110 ml, sucrose gradient
Passing of current: 700 V – 5.5 mA (beginning)–700 V – 1.1 mA (end), 44 hours.

Figure 1:
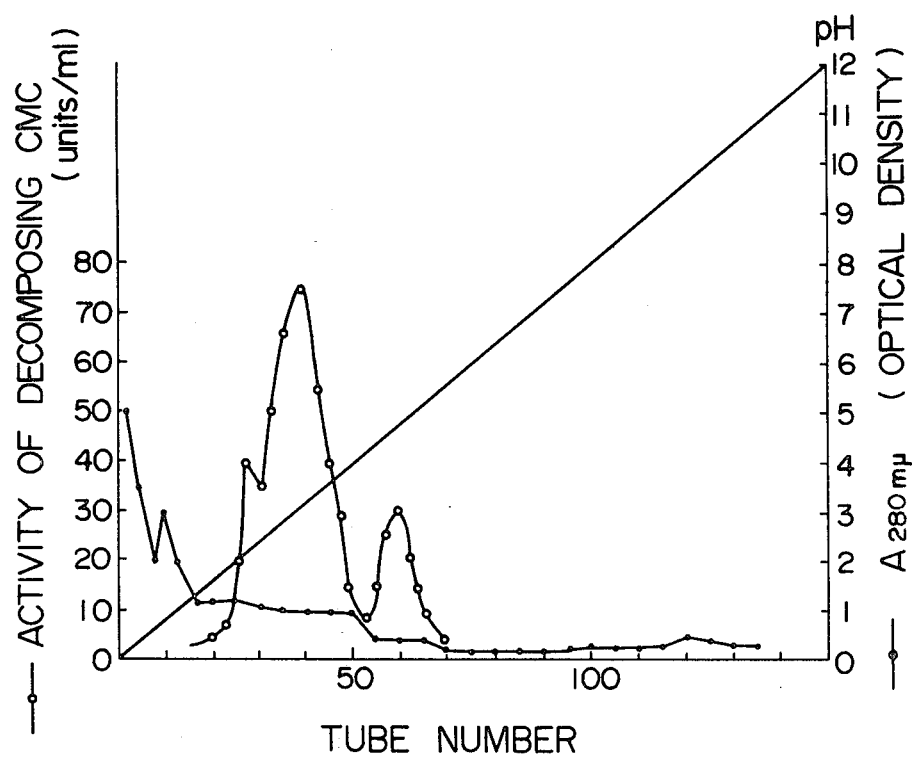
FIG. 1 is a fractionation chart of C-TAP (an enzyme produced by a microorganism of the genus Trichoderma)
Figure 2:
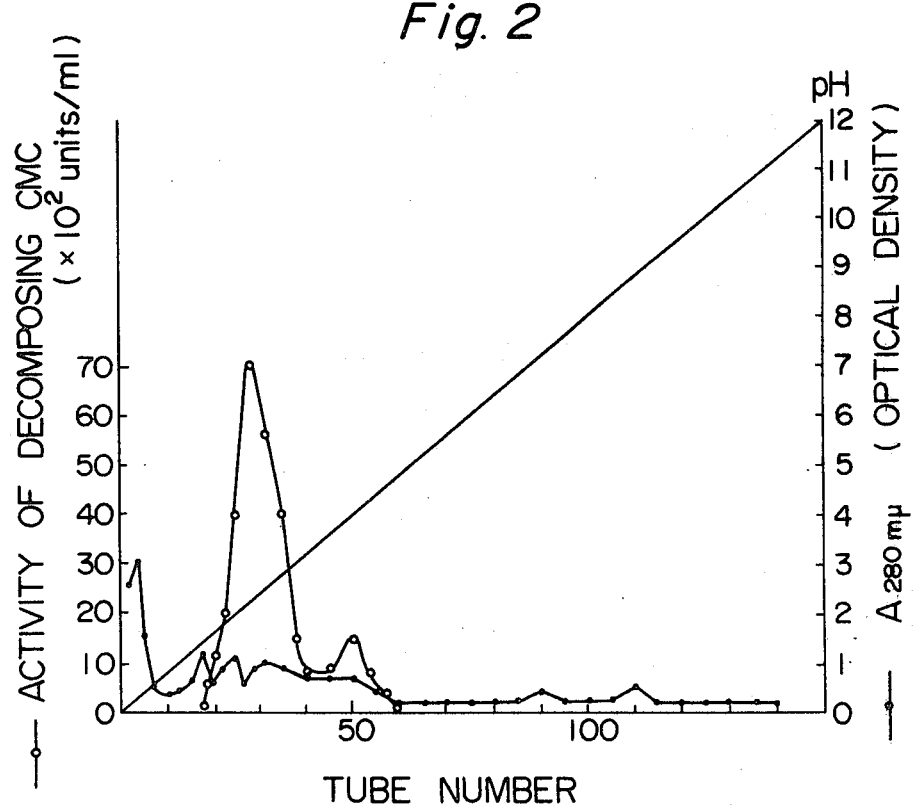
FIG. 2 is a fractionation chart of C-AP (an enzyme produced by a microorganism of the genus Aspergillus)

The fractionation charts shown in FIGS. 1 and 2 are obtained. It is clearly seen from these charts that these enzymes do not contain those components having the activity of disintegrating plant tissues which will be eluted at a pH of 8 to 12.

Figure 3:
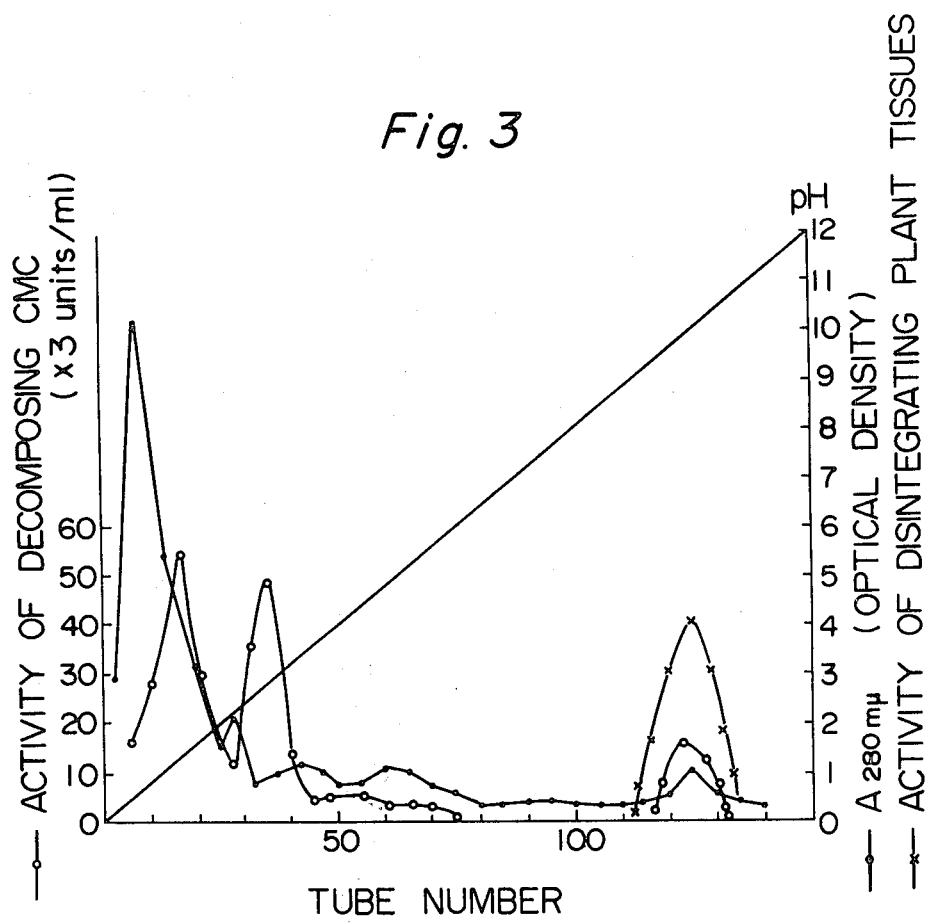
FIG. 3 is a fractionation chart of Doriselase (an enzyme produced from the hyphae of mushrooms)
Figure 4:
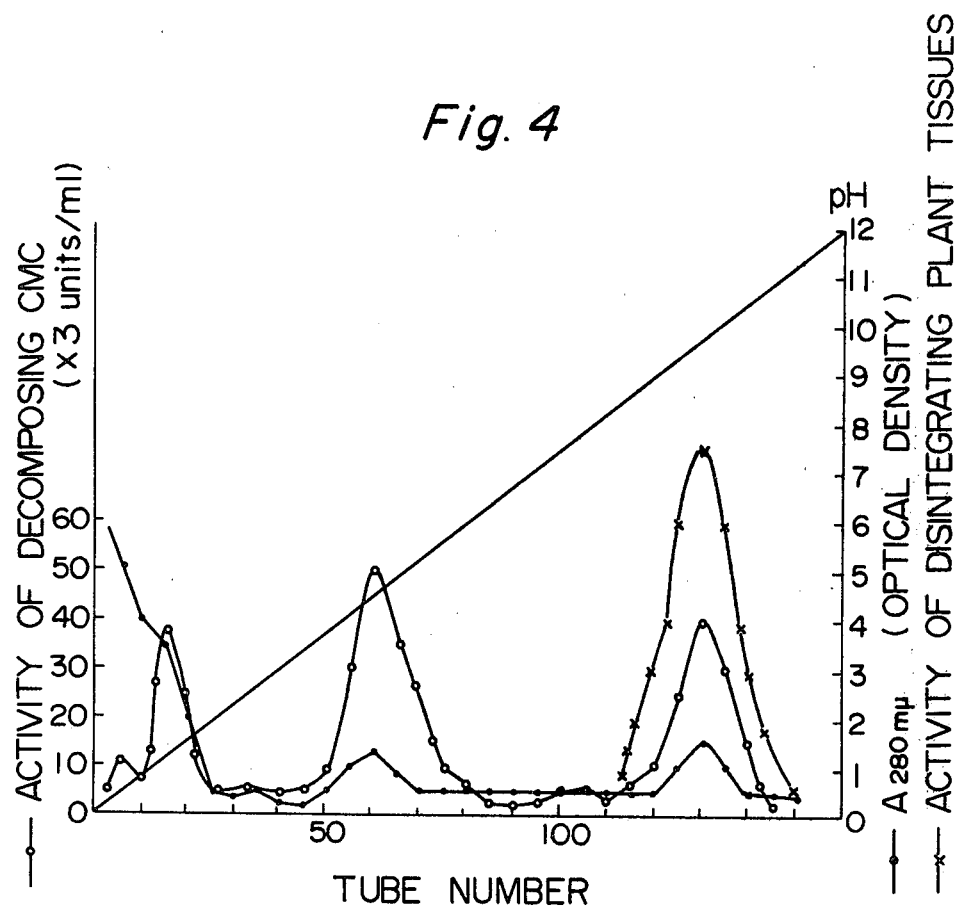
FIG. 4 is a fractionation chart of Macerozyme (an enzyme produced from a microorganism of the genus Rhizopus).

When an enzyme produced by the hyphae of mushrooms which is sold under the tradename Doriselase by Kyowa Hakko Co., Ltd. and an enzyme produced by a microorganism of the genus Rhizopus which is sold under the tradename Macerozyme by Yakult Co., Ltd. are fractionated in the same way as above for comparison, the fractionation charts shown in FIGS. 3 and 4 are obtained. It is seen from these charts that Doriselase and Macerozyme are cellulases having an optimum pH for enzymatic action at a weak acidity as in C-TAP and C-AP, but clearly differ from C-TAP and C-AP in that they contain large quantities of those components having the activity of disintegrating plant tissues which will be eluted at a pH of 8 to 12.

The data tabulated below show that enzyme components having the activity of disintegrating plant tissues which will be eluted at a pH of 8 to 12 have the activity of disintegrating the flavedo layer. In obtaining these data, the rind of mandarin orange ("Unshu" variety) and the rind of summer orange are each reacted with a mixture of C-TAP and C-AP, Doriselase, or Macerozyme, and the amount of decrease of the starting rind after the reaction and the amounts of essential oils (contained in the oil gland cells) and flavonoid in the reaction mixture are measured.

|  | Amount of decrease after the reaction (wt.%) | | Contents (%) in the reaction mixture | |
| --- | --- | --- | --- | --- |
|  | Rind of mandarin orange | Rind of summer orange | Essential oils | Flavonoid |
| Before the reaction | 0 | 0 | 0.085 | 484.5 |
| C-TAP plus C-AP | 1.6 | 1.12 | 0.067 | 484.5 |
| Dorisalase | 21.54 | 15.13 | 0.068 | 663.5 |
| Macerozyme | 42.68 | 29.99 | 0.20 | 980.5 |

In a preferred embodiment of the present invention, a whole citrus fruit or its rind which has been steamed and crushed is mixed with at least 0.01% by weight, preferably at least 0.05% by weight, of the specified enzyme, and subjected to enzymatic reaction with stirring at a pH of about 2.5 to 6.5 and a temperature of 30° to 55° C. for 2 to 24 hours. The reaction mixture is heated at a high temperature to deactivate the enzyme. The reaction mixture is then filtered, and the residue is separated. The upper limit to the amount of the enzyme is determined depending upon its cost. Heating may be unnecessary, or even when it is necessary, the heating temperature is low. Accordingly, the loss of vitamins during the reaction is small. The juice produced by the process of this invention is free from offensive odors and bitterness, and is nutritionally excellent.

The following Example and Comparative Examples illustrate the present invention more specifically.

EXAMPLE

Mandarin orange of "Unshu" variety (whole fruit) having a crude fat content of 0.3% by weight was steamed at 100° C. for 2 minutes, and crushed to a size of less than 5 mm. C-TAP (an enzyme produced by *Trichoderma viride*) was added to the crushed material in an amount of 0.2% based on the weight of the raw material. The mixture was reacted with stirring in an enzymatic reaction tank at a pH of 3.9 and a temperature of 45° C. for 3 hours. After the reaction, the reaction mixture was heated at 100° C. for 1 minute to deactivate the enzyme. The reaction mixture was filtered by a pulper of 50 mesh to produce a product having a crude fat content of 0.1 to 0.15% in a yield of 93%.

Canned juices were produced from this product, and subjected to sensual tests. The offensive smell (molasses-like smell) and bitterness of the rind were not noted at all.

The residue obtained by the filtration was found to contain a flavedo layer (containing oil gland cells).

Similar results to the above were obtained when the above procedure was repeated using C-AP (an enzyme produced from ASP niger) instead of C-TAP.

COMPARATIVE EXAMPLE 1

The procedure of Example was repeated except that Doriselase (an enzyme prepared by the hyphae of mushrooms) was used instead of C-TAP. The flavedo layer containing oil gland cells was consequently decomposed, and there was hardly any filtration residue. This afforded a yield of 95%. However, the product contained 0.3% of the crude fat.

When canned juices were produced from this product and subjected to sensual tests, the offensive odor and bitterness of the rind were noted, and the juices were not fit for drinking.

COMPARATIVE EXAMPLE 2

The procedure of Example was repeated except that Maserozyme (an enzyme produced from a microorganism of the genus Rhizopus) was used instead of C-TAP. As in Comparative Example 1, the flavedo layer containing oil gland cells was decomposed, and there was hardly any filtration residue. This afforded a yield of 95%, but the product contained 0.3% of the crude fat.

Canned juices were produced from this product and subjected to sensual tests, the offensive odor and bitterness of the rind were noted, and the juices were not fit for drinking.

What we claim is:

1. A process for producing orange juice which comprises steaming and crushing a whole orange or its rind, adding to the crushed material a cellulase enzyme produced by *Trichoderma viride* or a cellulase enzyme produced by *Aspergillus niger,* to form a mixture,
   said enzymes being free from those components having the activity of disintegrating the flavedo layer and said enzymes having the property that when fractionated by elution at a pH between 8 and 12, no enzyme component having the activity of disintegrating plant tissues is eluted,
   reacting said mixture at a temperature of 30° to 55° C., deactivating the enzyme, filtering the reaction mixture and separating the residue.

* * * * *